(12) United States Patent
Jang et al.

(10) Patent No.: US 10,033,101 B2
(45) Date of Patent: Jul. 24, 2018

(54) NEAR FIELD COMMUNICATION ANTENNA, NEAR FIELD COMMUNICATION DEVICE AND MOBILE SYSTEM HAVING THE SAME

(71) Applicant: SAMSUNG ELECTRONICS CO., LTD., Suwon-si (KR)

(72) Inventors: Yo-Han Jang, Seoul (KR); Il-jong Song, Suwon-si (KR); Young-Ki Lee, Incheon (KR); Young-Joo Lee, Yongin-si (KR); Hyeon-Hee Choi, Hwasung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 15/179,395

(22) Filed: Jun. 10, 2016

(65) Prior Publication Data

US 2016/0365635 A1 Dec. 15, 2016

(30) Foreign Application Priority Data

Jun. 12, 2015 (KR) .................. 10-2015-0083130
May 24, 2016 (KR) .................. 10-2016-0063686

(51) Int. Cl.
*H01Q 7/00* (2006.01)
*H04B 5/00* (2006.01)
(Continued)

(52) U.S. Cl.
CPC ............... *H01Q 7/00* (2013.01); *H01Q 1/38* (2013.01); *H04B 5/0087* (2013.01); *H01Q 1/243* (2013.01)

(58) Field of Classification Search
CPC ........... H04Q 7/00; H04Q 1/243; H04Q 1/38; H04Q 1/2208; H04Q 1/36; H04Q 1/50; H04B 5/0087; H04B 5/0081
See application file for complete search history.

(56) References Cited

U.S. PATENT DOCUMENTS 8,517,280 B2 * 8/2013 Owada ............ G06K 19/07784
235/451
8,847,844 B2 * 9/2014 Kato .................... G08B 13/00
340/572.7

(Continued)

FOREIGN PATENT DOCUMENTS

JP 2007-180805 A 7/2007
JP 2010-4257 A 1/2010

(Continued)

*Primary Examiner* — Tho G Phan
(74) *Attorney, Agent, or Firm* — Sughrue Mion, PLLC

(57) ABSTRACT

A near field communication (NFC) antenna includes a first antenna electrode and a second antenna electrode, and a loop coil. The first and second antenna electrodes are formed on a first surface of a substrate. The loop coil is formed on the first surface of the substrate, is directly coupled between the first antenna electrode and the second antenna electrode, and includes a first plurality of turns. The first antenna electrode is located inside each of the plurality of turns of the loop coil, and the second antenna electrode is located outside each of the plurality of turns of the loop coil. An imaginary line passing through the first antenna electrode and the second antenna electrode is parallel to one of edges of the substrate. Each of the first plurality of turns of the loop coil does not overlap each other.

20 Claims, 12 Drawing Sheets

(51) Int. Cl.
*H01Q 1/38* (2006.01)
*H01Q 1/24* (2006.01)

(56) References Cited

U.S. PATENT DOCUMENTS

| | | | | |
|---|---|---|---|---|
| 2008/0238803 A1* | 10/2008 | Yang | ...................... | H01Q 1/243 |
| | | | | 343/848 |
| 2009/0096694 A1* | 4/2009 | Ito | ................... | G06K 19/07749 |
| | | | | 343/788 |
| 2009/0121949 A1* | 5/2009 | Washiro | ................... | H01Q 7/00 |
| | | | | 343/702 |
| 2009/0121955 A1* | 5/2009 | Kubo | ............... | G06K 19/07749 |
| | | | | 343/788 |
| 2009/0295658 A1 | 12/2009 | Xi | | |
| 2010/0194660 A1* | 8/2010 | Yoneda | .................... | H01Q 1/22 |
| | | | | 343/867 |
| 2014/0346886 A1 | 11/2014 | Yang et al. | | |

FOREIGN PATENT DOCUMENTS

| KR | 10-0883830 B1 | 2/2009 |
|---|---|---|
| KR | 10-1263321 B1 | 5/2013 |
| KR | 10-1263323 B1 | 5/2013 |
| KR | 10-1265300 B1 | 5/2013 |
| KR | 10-1488607 B1 | 2/2015 |
| KR | 10-2015-0072911 A | 6/2015 |

\* cited by examiner

NEAR FIELD COMMUNICATION ANTENNA, NEAR FIELD COMMUNICATION DEVICE AND MOBILE SYSTEM HAVING THE SAME

CROSS-REFERENCE TO RELATED APPLICATION

This application claims priority under 35 USC § 119 from Korean Patent Application No. 10-2015-0083130, filed on Jun. 12, 2015 and Korean Patent Application No. 10-2016-0063686, filed on May 24, 2016 in the Korean Intellectual Property Office (KIPO), the contents of which are herein incorporated by reference in their entireties.

BACKGROUND

1. Field

Methods and apparatuses consistent with exemplary embodiments relate to a wireless communication technology, and more particularly to an antenna for near field communication (NFC), an NFC device including the antenna, and a mobile system including the NFC device.

2. Description of Related Art

Near field communication (NFC) technology is a short-range wireless communication technology. As NFC technology has been developed, NFC devices have been more commonly employed in mobile devices.

Mobile NFC devices communicate with each other easily using NFC. In addition an NFC device can be used for a mobile payment.

Generally, an NFC device includes an NFC antenna for emitting an electromagnetic wave. Production cost and performance of an NFC device may be dependent on a design of an NFC antenna.

Therefore, if production cost of an NFC antenna increases, production cost of an NFC device and a mobile device including the NFC antenna may also increase.

SUMMARY

Exemplary embodiments are directed to an antenna for near field communication (NFC) that reduces production cost while maintaining high performance.

One or more exemplary embodiments are directed to provide an NFC device including the antenna.

One or more exemplary embodiments are directed to provide a mobile system including the NFC device.

According to an aspect of an exemplary embodiment, there is provided a near field communication (NFC) antenna, including: a first antenna electrode and a second antenna electrode formed on a first surface of a substrate; and a loop coil formed on the first surface of the substrate, the loop coil being directly coupled between the first antenna electrode and the second antenna electrode and including a first plurality of turns, wherein the first antenna electrode is located inside each of the first plurality of turns of the loop coil, and the second antenna electrode is located outside each of first the plurality of turns of the loop coil.

The plurality of turns of the loop coil may pass between the first antenna electrode and the second antenna electrode.

The plurality of turns of the loop coil may be non-overlapped with each other.

Each of the plurality of turns of the loop coil may have a rectangular shape.

Each of the plurality of turns of the loop coil may have a circular shape.

The substrate may include a flexible printed circuit board (FPCB).

The substrate may be configured to be installed on a battery of a mobile device.

The substrate may be configured to be installed on a back side cover of a mobile device.

The NFC antenna may further include: a resonance coil formed on the first surface of the substrate, the resonance coil may be physically detached from the loop coil, the first antenna electrode, and the second antenna electrode and may include a second plurality of turns.

The resonance coil may be located inside an innermost turn of the first plurality of turns of the loop coil.

A distance between the innermost turn of the first plurality of turns of the loop coil and an outermost turn of the second plurality of turns of the resonance coil may be less than 2 mm.

A self-resonance frequency of the resonance coil may correspond to 13.56 MHz.

Each of the second plurality of turns of the resonance coil may have a rectangular shape.

Each of the second plurality of turns of the resonance coil may have a circular shape.

The NFC antenna may further include: a resonance coil formed on the first surface of the substrate, the resonance coil being physically detached from the loop coil, the first antenna electrode and the second antenna electrode, and including one turn; and a resonance capacitor coupled between two ends of the resonance coil.

The resonance coil and the resonance capacitor may be located inside an innermost turn of the first plurality of turns of the loop coil.

A distance between the innermost turn of the first plurality of turns of the loop coil and the resonance coil may be less than 2 mm.

A resonance frequency formed by the resonance coil and the resonance capacitor may correspond to 13.56 MHz.

According to an aspect of another exemplary embodiment, there is provided a near field communication (NFC) device, including: an NFC chip including a first transmission electrode and a second transmission electrode, and configured to generate a transmission signal and to output the transmission signal through the first transmission electrode and the second transmission electrode; an NFC antenna formed on a first surface of a substrate, the NFC antenna including a first antenna electrode, a second antenna electrode, and a loop coil directly coupled between the first antenna electrode and the second antenna electrode, and configured to emit an electromagnetic wave based on the transmission signal; and a matching circuit coupled to the first transmission electrode, the second transmission electrode, the first antenna electrode and the second antenna electrode, and configured to perform impedance matching between the NFC chip and the NFC antenna, wherein the loop coil includes a plurality of turns, the first antenna electrode is located inside each of the plurality of turns of the loop coil, and the second antenna electrode is located outside each of the plurality of turns of the loop coil.

According to an aspect of yet another exemplary embodiment, there is provided a mobile system, including: a near field communication (NFC) device configured to communicate with an external device through NFC; a memory device configured to store output data; and an application processor configured to control operations of the NFC device and the memory device, wherein the NFC device includes: an NFC chip including a first transmission electrode and a second transmission electrode, and configured to generate a transmission signal corresponding to the output data and to output the transmission signal through the first transmission electrode and the second transmission electrode; an NFC antenna formed on a first surface of a substrate, the NFC antenna including a first antenna electrode, a second antenna electrode, and a loop coil directly coupled between the first antenna electrode and the second antenna electrode, and configured to emit an electromagnetic wave based on the transmission signal; and a matching circuit coupled to the first transmission electrode, the second transmission electrode, the first antenna electrode, and the second antenna electrode, and configured to perform impedance matching between the NFC chip and the NFC antenna, and wherein the loop coil includes a plurality of turns, the first antenna electrode is located inside each of the plurality of turns of the loop coil, and the second antenna electrode is located outside each of the plurality of turns of the loop coil.

BRIEF DESCRIPTION OF THE DRAWINGS

Illustrative, non-limiting exemplary embodiments will be more clearly understood from the following detailed description in conjunction with the accompanying drawings.

DETAILED DESCRIPTION OF EXEMPLARY EMBODIMENTS

Figure 1:
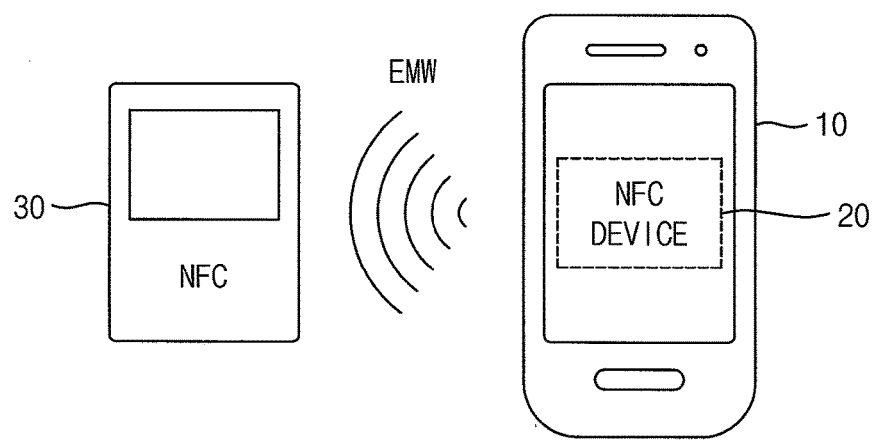
FIG. 1 is a diagram illustrating a mobile device according to one or more exemplary embodiments.

Various exemplary embodiments will be described more fully with reference to the accompanying drawings, in which one or more exemplary embodiments are shown. The present inventive concept may, however, be embodied in many different forms and should not be construed as limited to exemplary embodiments set forth herein. Rather, these exemplary embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a mobile device according to one or more exemplary embodiments.

Referring to FIG. 1, a mobile device 10 includes a near field communication (NFC) device 20. The NFC device 20 included in the mobile device 10 communicates with an external NFC device 30 (e.g., an NFC reader or an NFC card) through NFC.

For example, the NFC device 20 may alternately perform an operation of detecting whether an NFC card is near the NFC device 20 and an operation of detecting whether an NFC reader is near the NFC device 20.

When the NFC device 20 detects an NFC reader near the NFC device 20, the NFC device 20 may operate in a card mode, in which the NFC device 20 operates as a card. In the card mode, the NFC device 20 may communicate data with the NFC reader based on an electromagnetic wave EMW emitted from the NFC reader.

When the NFC device 20 detects an NFC card near the NFC device 20, the NFC device 20 may operate in a reader mode, in which the NFC device 20 operates as a reader. In the reader mode, the NFC device 20 may emit an electromagnetic wave EMW to communicate data with the NFC card.

In one or more exemplary embodiments, the mobile device 10 may be a mobile device such as a cellular phone, a smart phone, a tablet computer, a laptop computer, a personal digital assistant (PDA), a portable multimedia player (PMP), a digital camera, a music player, a portable game console, a navigation system, etc. In other exemplary embodiments, the mobile device 10 may be a wearable electronic device such as a smart watch, a wrist band type electronic device, a necklace type electronic device, a glasses type electronic device, etc.

Figure 2:
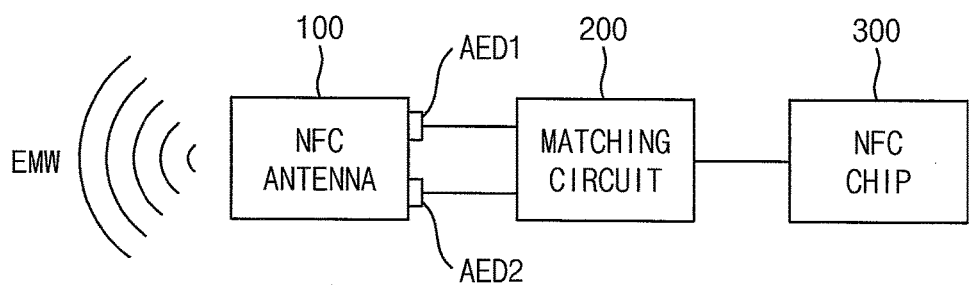
FIG. 2 is a block diagram illustrating a near field communication (NFC) device according to one or more exemplary embodiments.

FIG. 2 is a block diagram illustrating a near field communication (NFC) device according to one or more exemplary embodiments.

An NFC device 20 included in the mobile device 10 of FIG. 1 may be implemented as the NFC device 20 of FIG. 2.

Referring to FIG. 2, the NFC device 20 may include an NFC antenna 100, a matching circuit 200, and an NFC chip 300.

The NFC antenna 100 may include a first antenna electrode AED1 and a second antenna electrode AED2. The NFC antenna 100 may be coupled to the matching circuit 200 through the first antenna electrode AED1 and the second antenna electrode AED2. The NFC antenna 100 may further include a loop coil, which may be coupled between the first antenna electrode AED1 and the second antenna electrode AED2, and includes a plurality of turns.

Generally, an NFC antenna according to one or more exemplary embodiments may be formed on one surface of a substrate. That is, the first antenna electrode AED1, the second antenna electrode AED2, and the loop coil included in the NFC antenna 100 may all be formed on a first surface of the substrate, and two ends of the loop coil may be directly coupled to the first antenna electrode AED1 and the second antenna electrode AED2, respectively, on the first surface of the substrate.

The matching circuit 200 may be coupled between the NFC antenna 100 and the NFC chip 300. The matching circuit 200 may perform impedance matching between the NFC antenna 100 and the NFC chip 300. The matching circuit 200 may include a capacitor that forms a resonance circuit together with the NFC antenna 100. A resonance frequency of the NFC device 20 may be adjusted to a desired frequency (e.g., 13.56 MHz) based on a capacitance of the capacitor included in the matching circuit 200.

In the reader mode, the NFC chip 300 may generate a transmission signal and provide the transmission signal to the NFC antenna 100 through the matching circuit 200. The NFC antenna 100 may emit the electromagnetic wave EMW based on the transmission signal to communicate data with an external NFC card. Because the external NFC card includes a resonance circuit that includes an antenna having an inductor and a resonance capacitor, a mutual induction may occur between the NFC antenna 100 and the external NFC card, which is near the NFC device 20, while the NFC antenna 100 emits the electromagnetic wave EMW. Therefore, the external NFC card may receive the transmission signal by demodulating a signal generated by the mutual induction.

In the card mode, because a mutual induction occurs between the NFC antenna 100 and an external NFC reader by the electromagnetic wave EMW emitted from the external NFC reader, the NFC antenna 100 may provide an antenna voltage, which is generated at the first antenna electrode AED1 and the second antenna electrode AED2 through the mutual induction, to the NFC chip 300 through the matching circuit 200. The NFC chip 300 may receive data transmitted from the external NFC reader by demodulating the antenna voltage.

Figure 3:
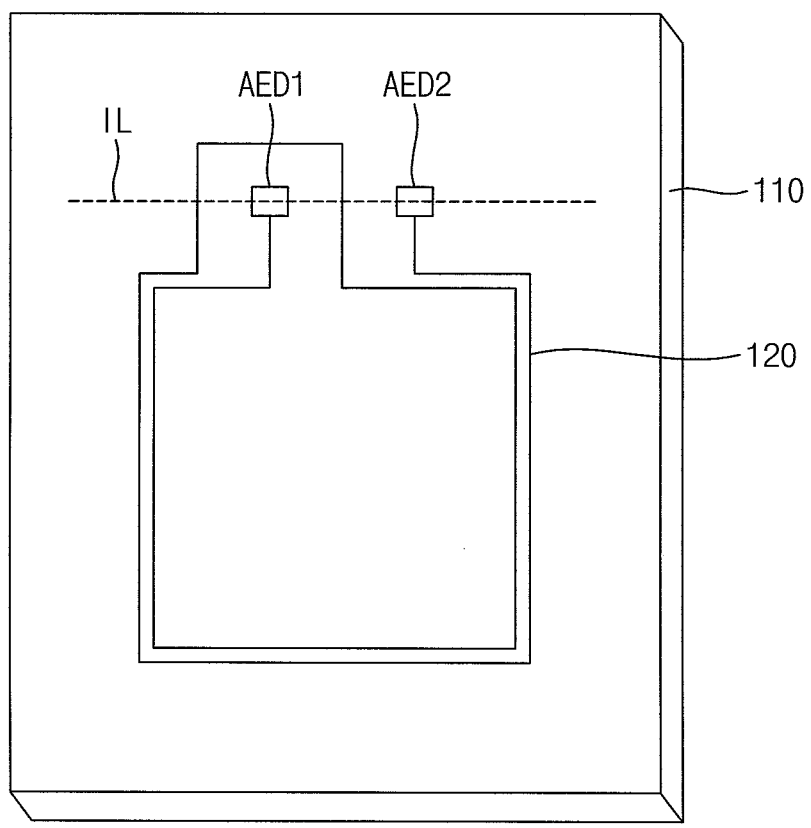
FIGS. 3 and 4 are diagrams illustrating examples of an NFC antenna included in the NFC device of FIG. 2 according to one or more exemplary embodiments.
Figure 4:
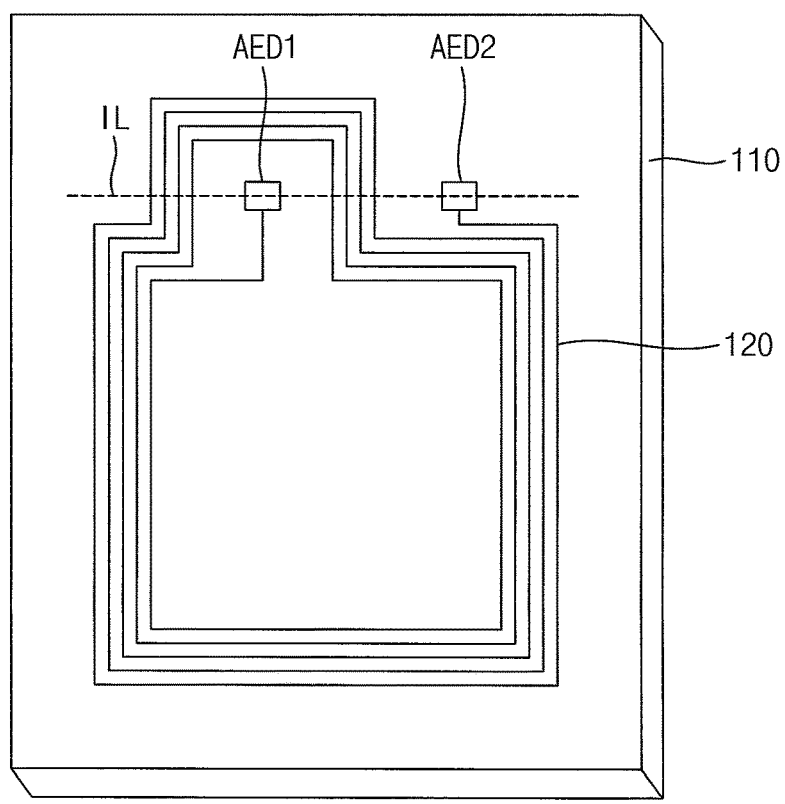

FIGS. 3 and 4 are diagrams illustrating examples of an NFC antenna included in the NFC device of FIG. 2.

Referring to FIGS. 3 and 4, an NFC antenna 100*a* may be formed on a substrate 110.

The NFC antenna 100*a* may include the first antenna electrode AED1, the second antenna electrode AED2, and a loop coil 120 formed on a first surface (e.g., an upper surface) of the substrate 110. The first antenna electrode AED1 and the second antenna electrode AED2 may be spaced apart from each other. In addition, as illustrated in FIGS. 3 and 4, the first antenna electrode AED1 and the second antenna electrode AED2 may be formed on the first surface of the substrate 110 such that an imaginary line IL passing through the first antenna electrode AED1 and the second antenna electrode AED2 is parallel to one of edges of the substrate 110.

The loop coil 120 may include a plurality of turns. The loop coil 120 may be directly coupled between the first antenna electrode AED1 and the second antenna electrode AED2 on the first surface of the substrate 110. The plurality of turns of the loop coil 120 may be non-overlapped with each other. In one or more exemplary embodiments, the loop coil 120 may be formed of any metal material having a high conductivity, such as copper, silver, aluminum, etc.

In FIG. 3, the loop coil 120 is illustrated to include two turns. In FIG. 4, the loop coil 120 is illustrated to include five turns. However, exemplary embodiments are not limited thereto, and the loop coil 120 may include more than two turns.

As illustrated in FIGS. 3 and 4, the first antenna electrode AED1 may be located inside each of the plurality of turns of the loop coil 120, and the second antenna electrode AED1 may be located outside each of the plurality of turns of the loop coil 120.

That is, the plurality of turns of the loop coil 120 may be formed to pass between the first antenna electrode AED1 and the second antenna electrode AED2. Therefore, a first end of the coop coil 120 may be directly coupled to the first antenna electrode AED1 inside the plurality of turns of the loop coil 120, and a second end of the coop coil 120 may be directly coupled to the second antenna electrode AED2 outside the plurality of turns of the loop coil 120.

In FIGS. 3 and 4, each of the plurality of turns of the loop coil 120 is illustrated to have a rectangular shape. However, exemplary embodiments are not limited thereto, and each of the plurality of turns of the loop coil 120 may have a circular shape, an oval shape, or any other shape.

In the NFC antenna 100*a* according to exemplary embodiments, the plurality of turns of the loop coil 120 may be formed to pass between the first antenna electrode AED1 and the second antenna electrode AED2, such that the first antenna electrode AED1 may be located inside each of the plurality of turns of the loop coil 120 and the second antenna electrode AED1 may be located outside each of the plurality of turns of the loop coil 120. Therefore, two ends of the loop coil 120 may be directly coupled, respectively, to the first antenna electrode AED1 and the second antenna electrode AED2 on the first surface of the substrate 110 while the plurality of turns of the loop coil 120 may not overlap with each other.

As described above, because the NFC antenna 100*a* according to one or more exemplary embodiments is formed on one surface of the substrate 110, production cost of the NFC antenna 100a may decrease, production yield of the NFC antenna 100a may increase, and a thickness of the NFC antenna 100a may decrease.

Figure 5:
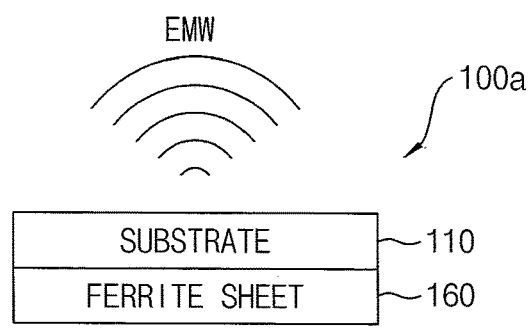
FIG. 5 is a diagram illustrating a substrate on which an antenna is formed according to one or more exemplary embodiments.

FIG. 5 is a diagram illustrating a substrate on which an antenna is formed according to one or more exemplary embodiments.

In one or more exemplary embodiments, the substrate 110 may correspond to a printed circuit board (PCB). In other exemplary embodiments, the substrate 110 may correspond to a flexible printed circuit board (FPCB).

In one or more exemplary embodiments, as illustrated in FIG. 5, the NFC antenna 100a may further include a magnetic sheet 160 disposed under a second surface (e.g., a lower surface) of the substrate 110. The second surface corresponds to an opposite surface of the first surface of the substrate 110 on which the first antenna electrode AED1, the second antenna electrode AED2, and the loop coil 120 are formed. That is, the magnetic sheet 160 may be disposed in a direction opposite to which the loop coil 120 emits the electromagnetic wave EMW. The magnetic sheet 160 may improve magnetic field radiation efficiency of the loop coil 120 by preventing the magnetic field for NFC from being reduced by an eddy current caused by a change of the magnetic field at the substrate 110. For example, the magnetic sheet 160 may be a ferrite sheet or a magneto-dielectric material (MDM) sheet.

Figure 6:
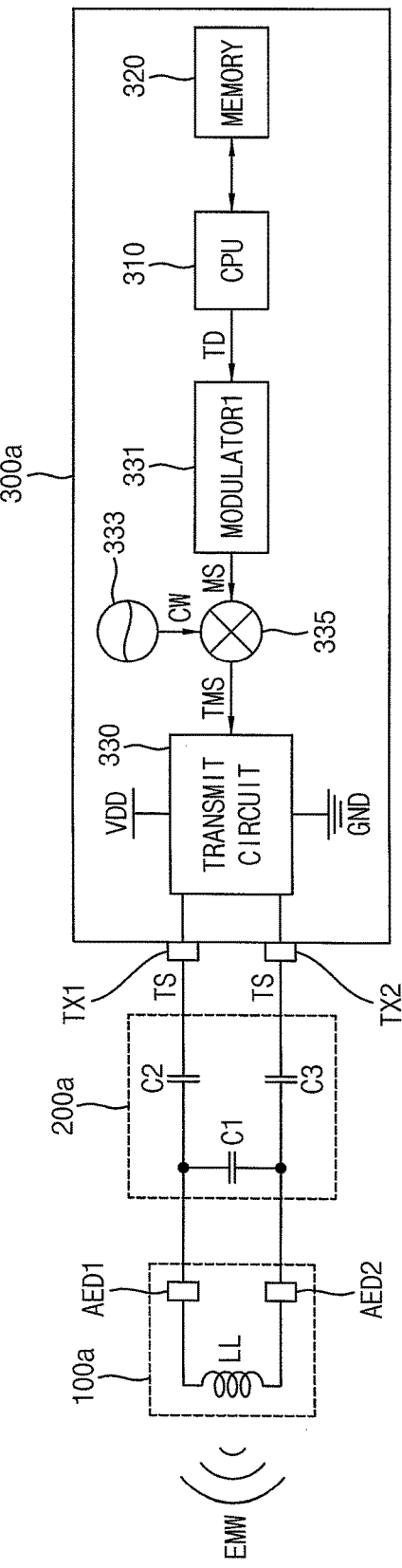
FIG. 6 is a block diagram illustrating an example of the NFC device of FIG. 2.

FIG. 6 is a block diagram illustrating an example of the NFC device of FIG. 2.

Referring to FIG. 6, the NFC device 20a may include an NFC antenna 100a, a matching circuit 200a, and an NFC chip 300a.

The NFC antenna 100a included in the NFC device 20a of FIG. 6 may be implemented with the NFC antenna 100a of FIGS. 3 and 4.

In FIG. 6, the NFC antenna 100a is represented as an equivalent circuit of the NFC antenna 100a of FIGS. 3 and 4. That is, the loop coil 120 included in the NFC antenna 100a is represented as an inductor LL in FIG. 6.

The matching circuit 200a may be coupled between the NFC antenna 100a and the NFC chip 300a. For example, the matching circuit 200a may be coupled to the NFC antenna 100a through the first antenna electrode AED1 and the second antenna electrode AED2, and be coupled to the NFC chip 300a through a first transmission electrode TX1 and a second transmission electrode TX2. The matching circuit 200a may perform impedance matching between the NFC antenna 100a and the NFC chip 300a.

In one or more exemplary embodiments, the matching circuit 200a may include a first capacitor C1, a second capacitor C2, and a third capacitor C3. The first capacitor C1 may be coupled between the first antenna electrode AED1 and the second antenna electrode AED2. The first capacitor C1 may form a resonance circuit together with the loop coil 120 included in the NFC antenna 100a. A resonance frequency of the NFC device 20a may be adjusted to a desired frequency (e.g., 13.56 MHz) by controlling a capacitance of the first capacitor C1. The second capacitor C2 may be coupled between the first antenna electrode AED1 and the first transmission electrode TX1. The third capacitor C3 may be coupled between the second antenna electrode AED2 and the second transmission electrode TX2. However, matching circuit 200a of FIG. 6 is only an example. According to one or more exemplary embodiments, the matching circuit 200a may be implemented in various structures to perform impedance matching between the NFC antenna 100a and the NFC chip 300a.

The NFC chip 300a may include a central processing unit (CPU) 310, a memory device 320, a first modulator 331, an oscillator 333, a mixer 335, and a transmit circuit 330.

When the NFC chip 300a performs a transmit operation in the reader mode, the CPU 310 may read out output data TD from the memory device 320 to provide the output data TD to the first modulator 331, the first modulator 331 may modulate the output data TD to generate a modulation signal MS, the oscillator 333 may generate a carrier signal CW having a carrier frequency (e.g., 13.56 MHz), and the mixer 335 may generate a transmission modulation signal TMS by synthesizing the carrier signal CW with the modulation signal MS.

The transmit circuit 330 may be coupled between a supply voltage VDD and a ground voltage GND.

The transmit circuit 330 may output the transmission signal TS, which corresponds to the transmission modulation signal TMS received from the mixer 335, through the first transmission electrode TX1 and the second transmission electrode TX2. The NFC antenna 100a may emit the electromagnetic wave EMW based on the transmission signal TS.

In one or more exemplary embodiments, the transmit circuit 330 may output the transmission signal TS corresponding to the transmission modulation signal TMS through the first transmission electrode TX1 and the second transmission electrode TX2 by connecting the first transmission electrode TX1 and the second transmission electrode TX2 to the supply voltage VDD through a pull-up load, or to the ground voltage GND through a pull-down load based on the transmission modulation signal TMS.

For example, the transmit circuit 330 may connect the first transmission electrode TX1 to the supply voltage VDD through the pull-up load and connect the second transmission electrode TX2 to the ground voltage GND through the pull-down load, or connect the first transmission electrode TX1 to the ground voltage GND through the pull-down load and connect the second transmission electrode TX2 to the supply voltage VDD through the pull-up load based on the transmission modulation signal TMS to output the transmission signal TS corresponding to the transmission modulation signal TMS through the first transmission electrode TX1 and the second transmission electrode TX2.

When the transmit circuit 330 connects the first transmission electrode TX1 to the supply voltage VDD through the pull-up load and connects the second transmission electrode TX2 to the ground voltage GND through the pull-down load, an output current may be generated from the supply voltage VDD, be provided to the matching circuit 200a and the NFC antenna 100a through the first transmission electrode TX1, and be sunk to the ground voltage GND through the second transmission electrode TX2.

When the transmit circuit 330 connects the first transmission electrode TX1 to the ground voltage GND through the pull-down load and connects the second transmission electrode TX2 to the supply voltage VDD through the pull-up load, the output current may be generated from the supply voltage VDD, be provided to the matching circuit 200a and the NFC antenna 100a through the second transmission electrode TX2, and be sunk to the ground voltage GND through the first transmission electrode TX1.

Figure 7:
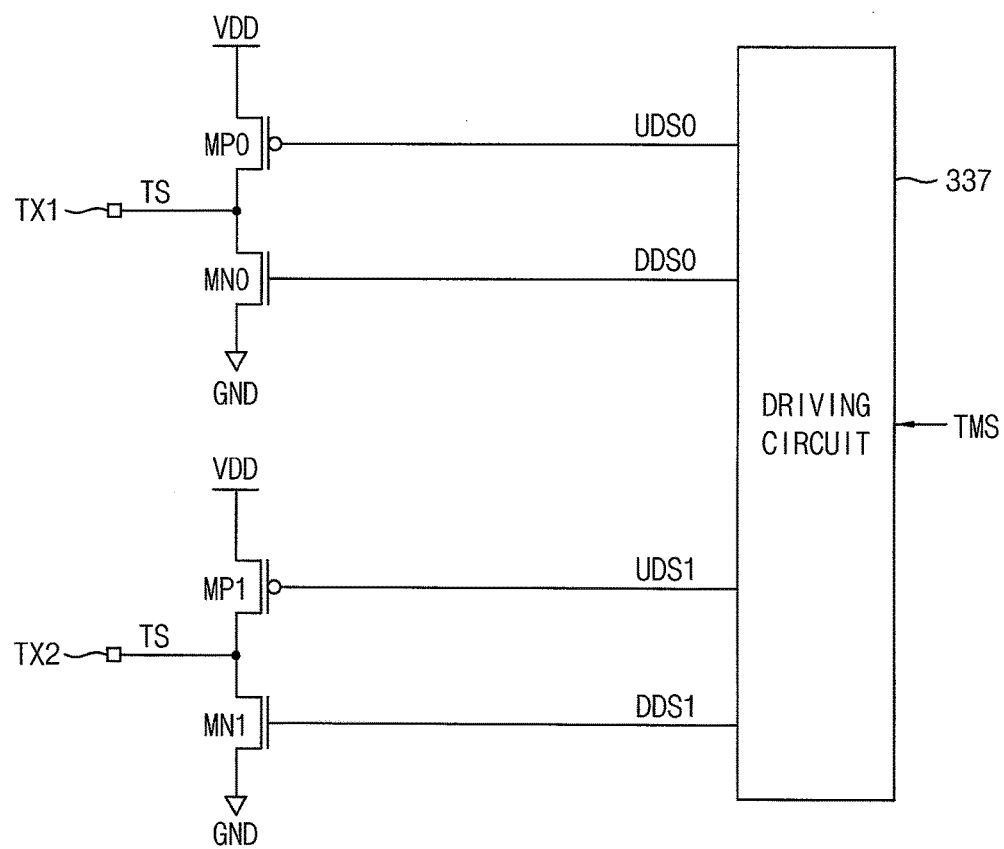
FIG. 7 is a block diagram illustrating an example of a transmit circuit included in the NFC device of FIG. 6.

FIG. 7 is a block diagram illustrating an example of a transmit circuit included in the NFC device of FIG. 6.

Referring to FIG. 7, the transmit circuit 330 may include a first pull-up transistor MP0, a second pull-up transistor MP1, a first pull-down transistor MN0, a second pull-down transistor MN1, and a driving circuit 337.

The first pull-up transistor MP0 and the second pull-up transistor MP1 may be p-type metal oxide semiconductor (PMOS) transistors. The first pull-down transistor MN0 and the second pull-down transistor MN1 may be n-type metal oxide semiconductor (NMOS) transistors.

The first pull-up transistor MP0 may be coupled between the supply voltage VDD and the first transmission electrode TX1, and the first pull-down transistor MN0 may be coupled between the first transmission electrode TX1 and the ground voltage GND.

The second pull-up transistor MP1 may be coupled between the supply voltage VDD and the second transmission electrode TX2, and the second pull-down transistor MN1 may be coupled between the second transmission electrode TX2 and the ground voltage GND.

The driving circuit 337 may drive the first pull-up transistor MP0 using a first pull-up driving signal UDS0, drive the first pull-down transistor MN0 using a first pull-down driving signal DDS0, drive the second pull-up transistor MP1 using a second pull-up driving signal UDS1, and drive the second pull-down transistor MN1 using a second pull-down driving signal DDS1.

The driving circuit 337 may turn on one of the first pull-up transistor MP0 and the first pull-down transistor MN0, and turn on one of the second pull-up transistor MP1 and the second pull-down transistor MN1 based on the transmission modulation signal TMS received from the mixer 335.

For example, the driving circuit 337 may turn on the first pull-up transistor MP0 and the second pull-down transistor MN1, and turn off the second pull-up transistor MP1 and the first pull-down transistor MN0, or turn on the second pull-up transistor MP1 and the first pull-down transistor MN0, and turn off the first pull-up transistor MP0 and the second pull-down transistor MN1 based on the transmission modulation signal TMS to output the transmission signal TS, which corresponds to the transmission modulation signal TMS, through the first transmission electrode TX1 and the second transmission electrode TX2.

Figure 8:
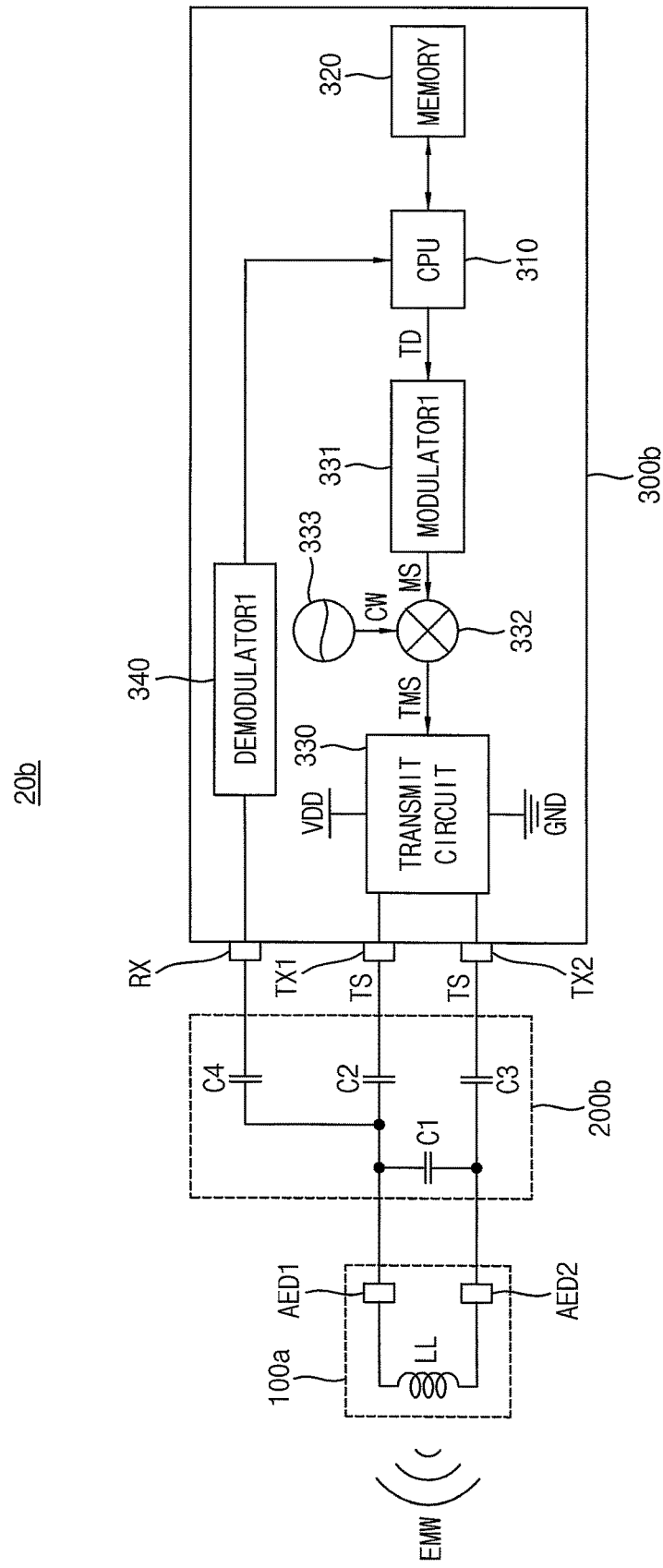
FIG. 8 is a block diagram illustrating an example of an NFC device of FIG. 2.

FIG. 8 is a block diagram illustrating an example of an NFC device of FIG. 2.

Referring to FIG. 8, an NFC device 20b may include an NFC antenna 100a, a matching circuit 200b, and an NFC chip 300b.

The NFC antenna 100a included in the NFC device 20b of FIG. 8 may be the same as the NFC antenna 100a included in the NFC device 20a of FIG. 6.

The matching circuit 200b may be coupled between the NFC antenna 100a and the NFC chip 300b. For example, the matching circuit 200b may be coupled to the NFC antenna 100a through the first antenna electrode AED1 and the second antenna electrode AED2, and be coupled to the NFC chip 300b through the first transmission electrode TX1, the second transmission electrode TX2, and a reception electrode RX. The matching circuit 200b may perform impedance matching between the NFC antenna 100a and the NFC chip 300b.

Compared with the matching circuit 200a included in the NFC device 20a of FIG. 6, the matching circuit 200b included in the NFC device 20b of FIG. 8 may further include a fourth capacitor C4. The fourth capacitor C4 may be coupled between the first antenna electrode AED1 and the reception electrode RX. According to one or more exemplary embodiments, the fourth capacitor C4 may be coupled between the second antenna electrode AED2 and the reception electrode RX. However, the matching circuit 200b illustrated in FIG. 8 is only an example. According to one or more exemplary embodiments, the matching circuit 200b may be implemented in various structures to perform impedance matching between the NFC antenna 100a and the NFC chip 300b.

Compared with the NFC chip 300a included in the NFC device 20a of FIG. 6, the NFC chip 300b included in the NFC device 20b of FIG. 8 may further include a first demodulator 340.

As described above, in the reader mode, the NFC antenna 100a may emit the electromagnetic wave EMW to communicate data with an external NFC card. Because the external NFC card includes a resonance circuit that includes an antenna having an inductance component and a resonance capacitor, a mutual induction may occur between the NFC antenna 100a and the external NFC card, which is near the NFC device 20b, while the NFC antenna 100a emits the electromagnetic wave EMW. Therefore, an antenna voltage may be generated at the first antenna electrode AED1 and the second antenna electrode AED2 through the mutual induction.

The antenna voltage may be provided to the NFC chip 300b through the fourth capacitor C4 and the reception electrode RX as a reception signal.

When the NFC chip 300b performs a receive operation in the reader mode, the first demodulator 340 may generate input data by demodulating the reception signal received through the reception electrode RX, and provide the input data to the CPU 310. The CPU 310 may store the input data in the memory device 320.

Figure 9:
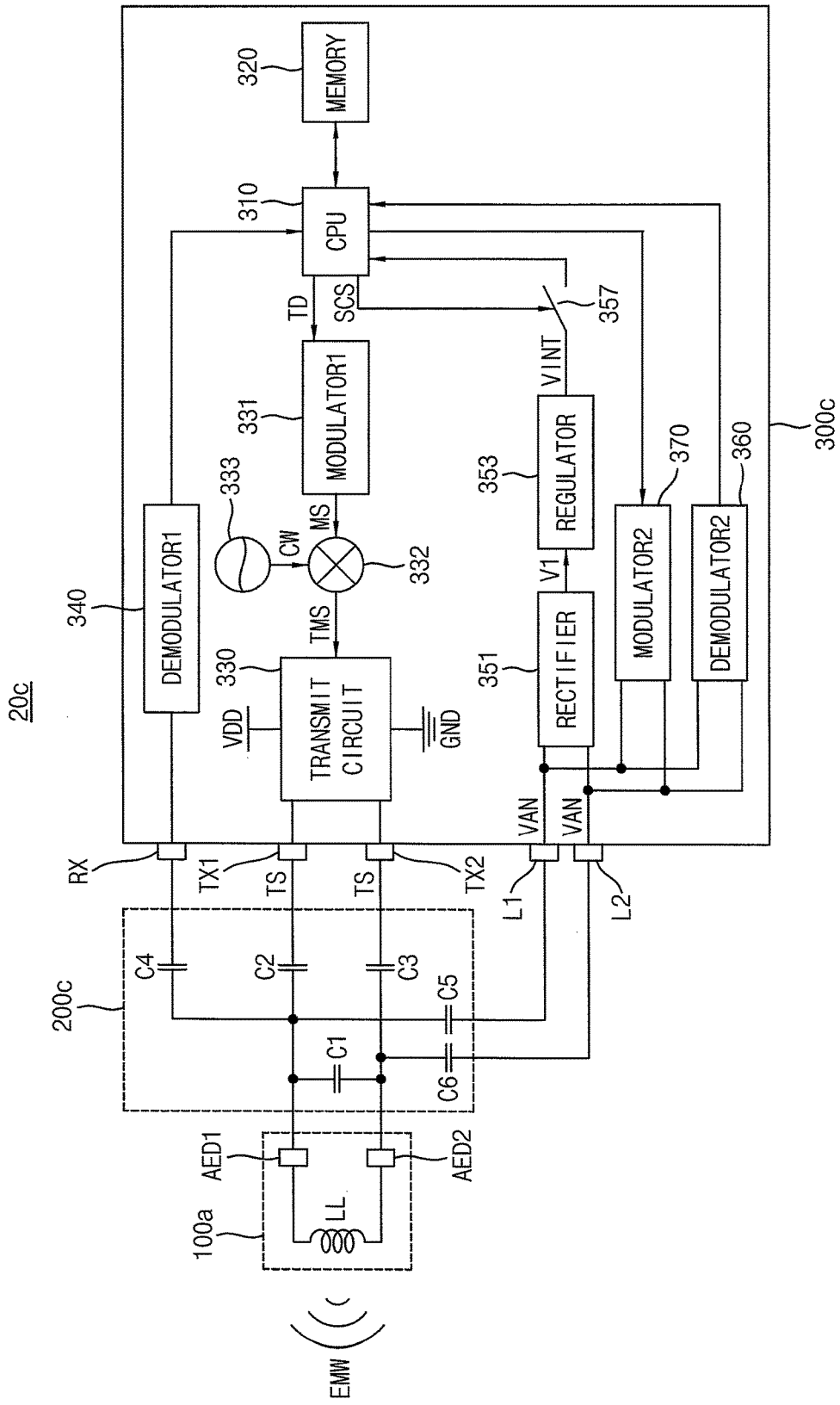
FIG. 9 is a block diagram illustrating an example of an NFC device of FIG. 2.

FIG. 9 is a block diagram illustrating an example of an NFC device of FIG. 2.

Referring to FIG. 9, the NFC device 20c may include an NFC antenna 100a, a matching circuit 200c, and an NFC chip 300c.

The NFC antenna 100a included in the NFC device 20c of FIG. 9 may be the same as the NFC antenna 100a included in the NFC device 20a of FIG. 6.

The matching circuit 200c may be coupled between the NFC antenna 100a and the NFC chip 300c. For example, the matching circuit 200c may be coupled to the NFC antenna 100a through the first antenna electrode AED1 and the second antenna electrode AED2, and be coupled to the NFC chip 300c through the first transmission electrode TX1, the second transmission electrode TX2, a reception electrode RX, a first power electrode L1, and a second power electrode L2. The matching circuit 200c may perform impedance matching between the NFC antenna 100a and the NFC chip 300c.

Compared with the matching circuit 200b included in the NFC device 20b of FIG. 8, the matching circuit 200c included in the NFC device 20c of FIG. 9 may further include a fifth capacitor C5 and a sixth capacitor C6. The fifth capacitor C5 may be coupled between the first antenna electrode AED1 and the first power electrode L1. The sixth capacitor C6 may be coupled between the second antenna electrode AED2 and the second power electrode L2. However, matching circuit 200c illustrated in FIG. 9 is only an example. According to one or more exemplary embodiments, the matching circuit 200c may be implemented in various structures to perform impedance matching between the NFC antenna 100a and the NFC chip 300c.

Compared with the NFC chip 300b included in the NFC device 20b of FIG. 8, the NFC chip 300c included in the NFC device 20c of FIG. 9 may further include a rectifier 351, a regulator 353, a power switch 357, a second demodulator 360, and a second modulator 370.

As described above, in the card mode, the NFC device 20c may communicate with an external NFC reader using the electromagnetic wave EMW emitted by the external NFC reader. That is, a mutual induction may occur between the NFC antenna 100a and the external NFC reader based on the electromagnetic wave EMW emitted by the external NFC reader. Therefore, an antenna voltage VAN may be generated at the first antenna electrode AED1 and the second antenna electrode AED2 through the mutual induction.

The antenna voltage VAN may be transferred to the first power electrode L1 and the second power electrode L2 through the fifth capacitor C5 and the sixth capacitor C6, respectively.

The rectifier 351 may generate a first voltage V1, which is a direct voltage, by rectifying the antenna voltage VAN received through the first power electrode L1 and the second power electrode L2.

The regulator 353 may generate an internal voltage VINT, which has a voltage level of a predetermined magnitude usable in the NFC chip 300c, using the first voltage V1.

The CPU 310 may control the overall operation of the NFC chip 300c. The CPU 310 may operate using the supply voltage VDD provided by a power source, such as a battery. In addition, the CPU 310 may receive the internal voltage VINT from the regulator 353 through the power switch 357. When the supply voltage VDD is equal to or higher than a predetermined voltage level, the CPU 310 may operate using the supply voltage VDD and disable a switch control signal SCS to turn off the power switch 357. When the supply voltage VDD is lower than the predetermined voltage level, the CPU 310 may enable the switch control signal SCS to turn on the power switch 357 such that the CPU 310 may operate using the internal voltage VINT provided by the regulator 353.

When the NFC chip 300c performs the receive operation in the card mode, the second demodulator 360 may generate input data by demodulating a signal received through the first power electrode L1 and the second power electrode L2, and provide the input data to the CPU 310. The CPU 310 may store the input data in the memory device 320.

When the NFC chip 300c performs the transmit operation in the card mode, the CPU 310 may read out output data from the memory device 320 to provide the output data to the second modulator 370, and the second modulator 370 may modulate the output data to output a modulation signal through the first power electrode L1 and the second power electrode L2. For instance, the second modulator 370 may generate the modulation signal by performing a load modulation on the output data. The NFC antenna 100a may transmit the output data to the external NFC reader by causing the mutual induction with the external NFC reader based on the modulation signal.

Figure 10:
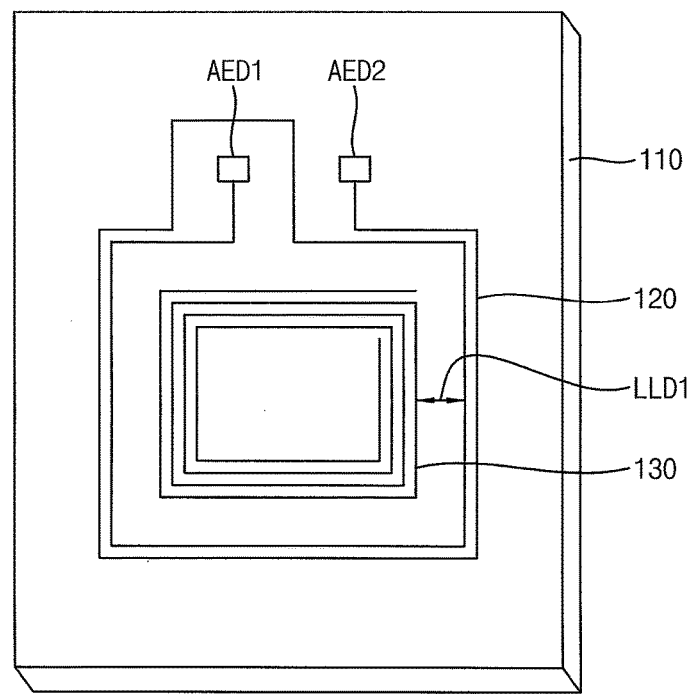
FIG. 10 is a diagram illustrating an example of an NFC antenna included in the NFC device of FIG. 2.

FIG. 10 is a diagram illustrating an example of an NFC antenna included in the NFC device of FIG. 2.

Referring to FIG. 10, an NFC antenna 100b may be formed on a substrate 110.

The NFC antenna 100b may include the first antenna electrode AED1, the second antenna electrode AED2, a loop coil 120, and a resonance coil 130 formed on a first surface (e.g., an upper surface) of the substrate 110.

The first antenna electrode AED1, the second antenna electrode AED2, and the loop coil 120 included in the NFC antenna 100b of FIG. 10 may be the same as the first antenna electrode AED1, the second antenna electrode AED2, and the loop coil 120 included in the NFC antenna 100a of FIGS. 3 and 4. Therefore, the NFC antenna 100b of FIG. 10 may be the same as the NFC antenna 100a of FIGS. 3 and 4, except that the NFC antenna 100b further includes the resonance coil 130.

Although the loop coil 120 included in the NFC antenna 100b is illustrated to have two turns in FIG. 10, exemplary embodiments are not limited thereto as described above with reference to FIGS. 3 and 4. According to one or more exemplary embodiments, the loop coil 120 may include more than two turns.

The resonance coil 130 may include a plurality of turns. In addition, the resonance coil 130 may be formed to be physically detached from the loop coil 120, the first antenna electrode AED1, and the second antenna electrode AED2. In one or more exemplary embodiments, the resonance coil 130 may be formed of any metal material having a high conductivity, such as copper, silver, aluminum, etc.

In one or more exemplary embodiments, the resonance coil 130 may be located inside the loop coil 120. For example, as illustrated in FIG. 10, the resonance coil 130 may be located inside an innermost turn of the plurality of turns of the loop coil 120.

Because a parasitic capacitor is formed between each of the plurality of turns of the resonance coil 130, the resonance coil 130 may be represented as an equivalent circuit including an inductor and a capacitor coupled to the inductor in parallel. Therefore, the resonance coil 130 may be formed to include appropriate turns such that a self-resonance frequency of the resonance coil 130 may correspond to 13.56 MHz.

Because the resonance coil 130 is physically detached from the loop coil 120, the resonance coil 130 may not receive an electrical signal from the loop coil 120. However, the resonance coil 130 may be magnetically coupled with the loop coil 120. Therefore, the resonance coil 130 may emit an electromagnetic wave based on the electromagnetic wave EMW received from the loop coil 120.

In one or more exemplary embodiments, a resonance frequency of the resonance coil 130 may be substantially the same as the resonance frequency of the loop coil 120 such that the resonance coil 130 may receive power efficiently from the electromagnetic wave EMW emitted by the loop coil 120. For example, the resonance frequency of the resonance coil 130 and the resonance frequency of the loop coil 120 may correspond to 13.56 MHz.

In addition, the resonance coil 130 may be located adjacent to the loop coil 120 such that the resonance coil 130 may receive power efficiently from the electromagnetic wave EMW emitted by the loop coil 120. For example, a distance LLD1 between the innermost turn of the plurality of turns of the loop coil 120 and an outermost turn of the plurality of turns of the resonance coil 130 may be less than 2 mm.

In FIG. 10, each of the plurality of turns of the resonance coil 130 is illustrated to have a rectangular shape. However, exemplary embodiments are not limited thereto, and each of the plurality of turns of the resonance coil 130 may have a circular shape, an oval shape, or any other shape.

As described above with reference to FIGS. 3, 4, and 10, because the NFC antenna 100b is formed on one surface of the substrate 110, production cost of the NFC antenna 100b may decrease, production yield of the NFC antenna 100b may increase, and a thickness of the NFC antenna 100b may decrease.

In addition, the NFC antenna 100b according to one or more exemplary embodiments may emit the electromagnetic wave EMW through the loop coil 120 and additionally emit the electromagnetic wave EMW through the resonance coil 130, which is magnetically coupled with the loop coil 120. Because the resonance coil 130 is physically detached from the matching circuit 200, the resonance coil 130 may have a relatively high Q factor (quality factor). Therefore, an intensity of the electromagnetic wave EMW emitted by the resonance coil 130 may be relatively high. As such, when the NFC device 20 of FIG. 2 is implemented to include the NFC antenna 100b of FIG. 10, a communication range of the NFC device 20 may be effectively increased.

Figure 11:
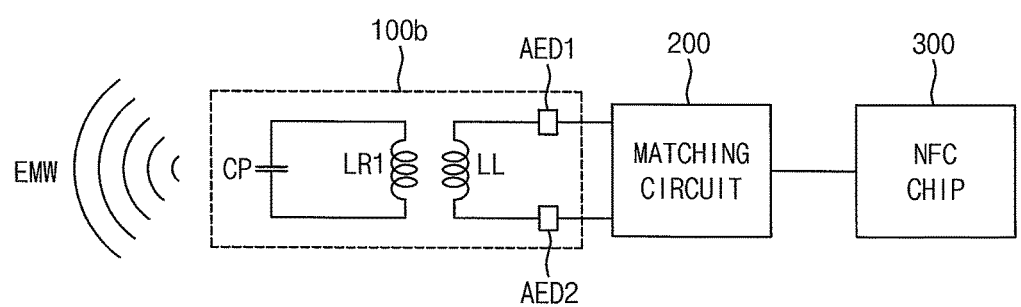
FIG. 11 is a block diagram illustrating an example of the NFC device of FIG. 2.

FIG. 11 is a block diagram illustrating an example of the NFC device of FIG. 2.

Referring to FIG. 11, an NFC device 20d may include an NFC antenna 100b, a matching circuit 200, and an NFC chip 300.

The NFC antenna 100b included in the NFC device 20d of FIG. 11 may be implemented with the NFC antenna 100b of FIG. 10.

In FIG. 11, the NFC antenna 100b may be represented as an equivalent circuit of the NFC antenna 100b of FIG. 10. That is, the loop coil 120 included in the NFC antenna 100b may be represented as an inductor LL in FIG. 11, and the resonance coil 130 included in the NFC antenna 100b may be represented as an inductor LR1 and a capacitor CP coupled to the inductor LR1 in parallel in FIG. 11.

The matching circuit 200 and the NFC chip 300 included in the NFC device 20d of FIG. 11 may be implemented with the matching circuit 200a and the NFC chip 300a included in the NFC device 20a of FIG. 6, the matching circuit 200b and the NFC chip 300b included in the NFC device 20b of FIG. 8, or the matching circuit 200c and the NFC chip 300c included in the NFC device 20c of FIG. 9.

As described above with reference to FIGS. 10 and 11, the NFC antenna 100b included in the NFC device 20d may emit the electromagnetic wave EMW through the loop coil 120 and additionally emit the electromagnetic wave EMW through the resonance coil 130, which is magnetically coupled with the loop coil 120. Because the resonance coil 130 is physically detached from the matching circuit 200, the resonance coil 130 may have a relatively high Q factor (quality factor). Therefore, an intensity of the electromagnetic wave EMW emitted by the resonance coil 130 may be relatively high. As such, a communication range of the NFC device 20d may be effectively increased.

Figure 12:
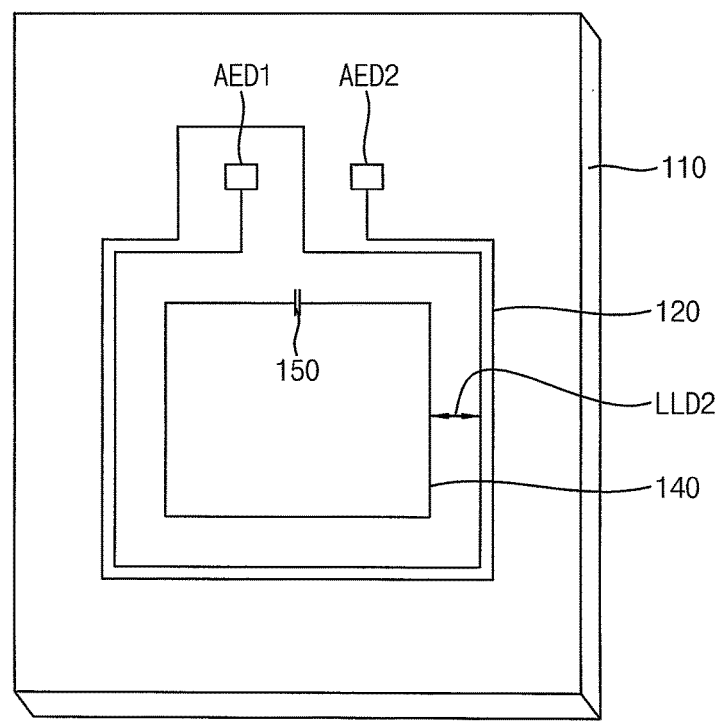
FIG. 12 is a diagram illustrating an example of an NFC antenna included in the NFC device of FIG. 2.

FIG. 12 is a diagram illustrating an example of an NFC antenna included in the NFC device of FIG. 2.

Referring to FIG. 12, an NFC antenna 100c may be formed on a substrate 110.

The NFC antenna 100c may include the first antenna electrode AED1, the second antenna electrode AED2, a loop coil 120, and a resonance coil 140, and a resonance capacitor 150 formed on a first surface (e.g., an upper surface) of the substrate 110.

The first antenna electrode AED1, the second antenna electrode AED2, and the loop coil 120 included in the NFC antenna 100c of FIG. 12 may be the same as the first antenna electrode AED1, the second antenna electrode AED2, and the loop coil 120 included in the NFC antenna 100a of FIGS. 3 and 4. Therefore, the NFC antenna 100c of FIG. 12 may be the same as the NFC antenna 100a of FIGS. 3 and 4 except that the NFC antenna 100c further includes the resonance coil 140 and the resonance capacitor 150.

Although the loop coil 120 included in the NFC antenna 100c is illustrated to have two turns in FIG. 12, exemplary embodiments are not limited thereto as described above with reference to FIGS. 3 and 4. According to one or more exemplary embodiments, the loop coil 120 may include more than two turns.

The resonance coil 140 may include one turn. In addition, the resonance coil 140 may be formed to be physically detached from the loop coil 120, the first antenna electrode AED1, and the second antenna electrode AED2. In some exemplary embodiments, the resonance coil 140 may be formed of any metal material having a high conductivity, such as copper, silver, aluminum, etc.

The resonance capacitor 150 may be coupled between two ends of the resonance coil 140.

In one or more exemplary embodiments, the resonance coil 140 and the resonance capacitor 150 may be located inside the loop coil 120. For example, as illustrated in FIG. 12, the resonance coil 140 and the resonance capacitor 150 may be located inside an innermost turn of the plurality of turns of the loop coil 120.

Because the resonance coil 140 and the resonance capacitor 150 are coupled together in parallel, the resonance coil 140 and the resonance capacitor 150 may form a resonance circuit. A capacitance of the resonance capacitor 150 may be adjusted such that a resonance frequency of the resonance circuit may correspond to 13.56 MHz.

Because the resonance coil 140 is physically detached from the loop coil 120, the resonance coil 140 may not receive an electrical signal from the loop coil 120. However, the resonance circuit, which is formed by the resonance coil 140 and the resonance capacitor 150, may be magnetically coupled with the loop coil 120. Therefore, the resonance coil 140 may emit an electromagnetic wave based on the electromagnetic wave EMW received from the loop coil 120.

In one or more exemplary embodiments, a resonance frequency of the resonance circuit may be substantially the same as the resonance frequency of the loop coil 120 such that the resonance coil 140 may receive power efficiently from the electromagnetic wave EMW emitted by the loop coil 120. For example, the resonance frequency of the resonance circuit and the resonance frequency of the loop coil 120 may correspond to 13.56 MHz.

In addition, the resonance coil 140 may be located adjacent to the loop coil 120 such that the resonance coil 140 may receive power efficiently from the electromagnetic wave EMW emitted by the loop coil 120. For example, a distance LLD2 between the innermost turn of the plurality of turns of the loop coil 120 and the resonance coil 140 may be less than 2 mm.

In FIG. 12, each of the plurality of turns of the resonance coil 140 is illustrated to have a rectangular shape. However, exemplary embodiments are not limited thereto, and each of the plurality of turns of the resonance coil 140 may have a circular shape, an oval shape, or any other shape.

As described above with reference to FIGS. 3, 4, and 12, because the NFC antenna 100c according to one or more exemplary embodiments is formed on one surface of the substrate 110, production cost of the NFC antenna 100c may decrease, production yield of the NFC antenna 100c may increase, and a thickness of the NFC antenna 100c may decrease.

In addition, the NFC antenna 100c according to one or more exemplary embodiments may emit the electromagnetic wave EMW through the loop coil 120 and additionally emit the electromagnetic wave EMW through the resonance coil 140, which is magnetically coupled with the loop coil 120. Because the resonance coil 140 is physically detached from the matching circuit 200, the resonance coil 140 may have a relatively high Q factor (quality factor). Therefore, an intensity of the electromagnetic wave EMW emitted by the resonance coil 140 may be relatively high. As such, when the NFC device 20 of FIG. 2 is implemented to include the NFC antenna 100c of FIG. 12, a communication range of the NFC device 20 may be effectively increased.

In addition, while the resonance coil 130 included in the NFC antenna 100b includes a number of turns such that the self-resonance frequency of the resonance coil 130 may correspond to 13.56 MHz, the resonance coil 140 included in the NFC antenna 100c may include one turn, and the resonance frequency of the resonance circuit formed by the resonance coil 140 and the resonance capacitor 150 may be set to 13.56 MHz by adjusting the capacitance of the resonance capacitor 150.

Figure 13:
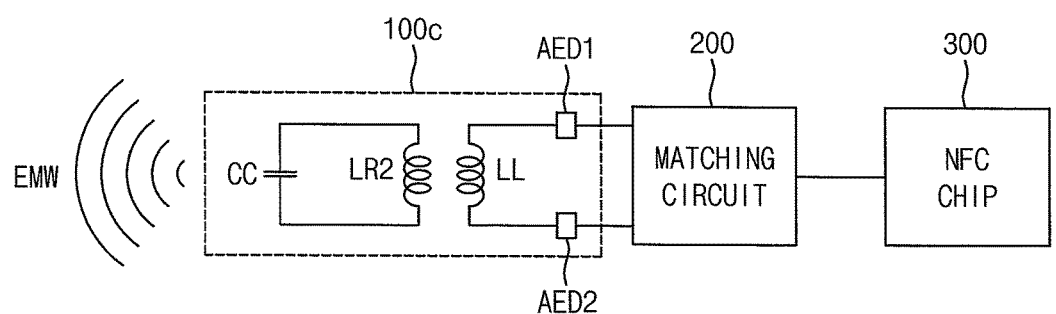
FIG. 13 is a block diagram illustrating an example of the NFC device of FIG. 2.

FIG. 13 is a block diagram illustrating an example of the NFC device of FIG. 2.

Referring to FIG. 13, the NFC device 20e may include an NFC antenna 100c, a matching circuit 200, and an NFC chip 300.

The NFC antenna 100c included in the NFC device 20e of FIG. 13 may be implemented with the NFC antenna 100c of FIG. 12.

In FIG. 13, the NFC antenna 100c may be represented as an equivalent circuit of the NFC antenna 100c of FIG. 12. That is, the loop coil 120 included in the NFC antenna 100c may be represented as an inductor LL in FIG. 13, the resonance coil 140 included in the NFC antenna 100c may be represented as an inductor LR2 in FIG. 13, and the resonance capacitor 150 included in the NFC antenna 100c may be represented as a capacitor CC in FIG. 13.

The matching circuit 200 and the NFC chip 300 included in the NFC device 20e of FIG. 13 may be implemented with the matching circuit 200a and the NFC chip 300a included in the NFC device 20a of FIG. 6, the matching circuit 200b and the NFC chip 300b included in the NFC device 20b of FIG. 8, or the matching circuit 200c and the NFC chip 300c included in the NFC device 20c of FIG. 9.

As described above with reference to FIGS. 12 and 13, the NFC antenna 100c included in the NFC device 20e may emit the electromagnetic wave EMW through the loop coil 120 and additionally emit the electromagnetic wave EMW through the resonance coil 140, which is magnetically coupled with the loop coil 120. Because the resonance coil 140 is physically detached from the matching circuit 200, the resonance coil 140 may have a relatively high Q factor (quality factor). Therefore, an intensity of the electromagnetic wave EMW emitted by the resonance coil 140 may be relatively high. As such, a communication range of the NFC device 20e may be effectively increased.

Figure 14:
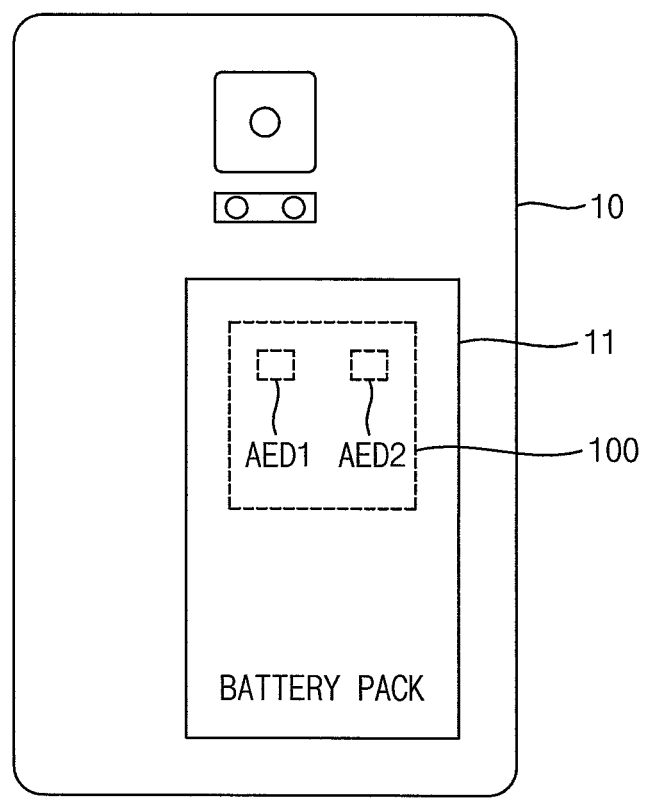
FIGS. 14 and 15 are diagrams illustrating examples of installation of the NFC device of FIG. 2 in a mobile device according to one or more exemplary embodiments.
Figure 15:
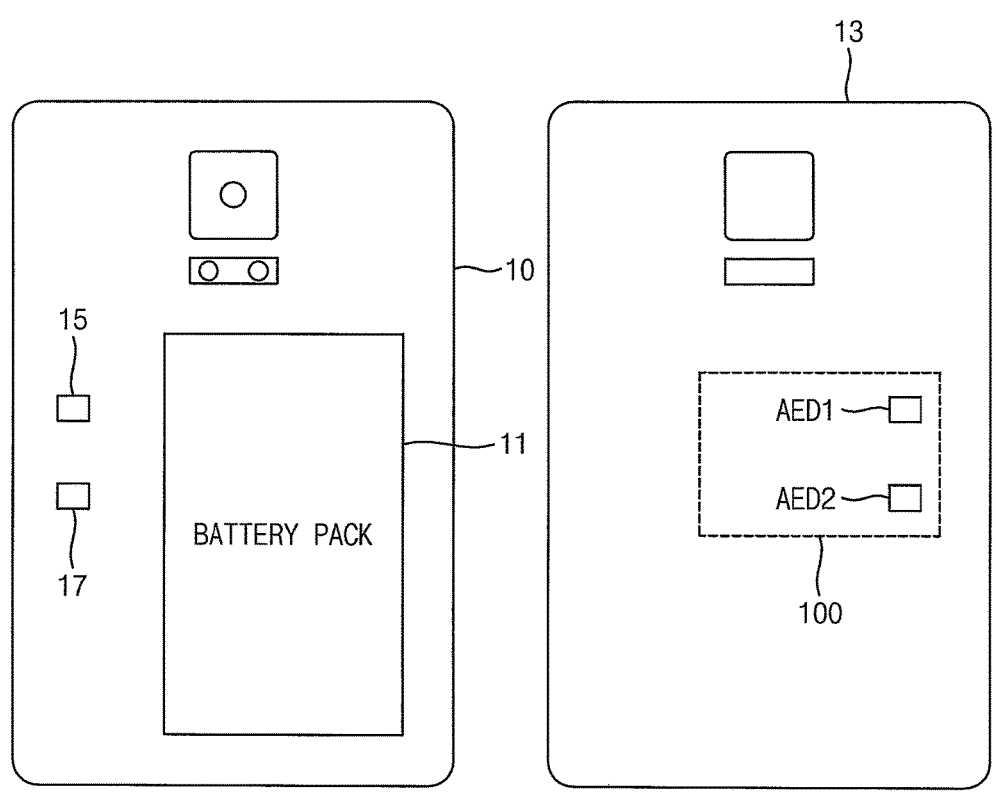

FIGS. 14 and 15 are diagrams illustrating examples of installation of an NFC antenna included in the NFC device of FIG. 2 in a mobile device.

In FIG. 14, a back side of the mobile device 10 without a back side cover is illustrated.

In one or more exemplary embodiments, as illustrated in FIG. 14, the NFC antenna 100 may be installed on a battery 11 of the mobile device 10.

The matching circuit 200 and the NFC chip 300 included in the NFC device 20 may be disposed inside a main body of the mobile device 10.

The first antenna electrode AED1 and the second antenna electrode AED2 of the NFC antenna 100 may be electrically connected to the matching circuit 200 through electrodes with which the battery 11 is coupled to the main body of the mobile device 10.

The first antenna electrode AED1 and the second antenna electrode AED2 of the NFC antenna 100 may be disposed close to each other. For example, as illustrated in FIG. 14, when the substrate 110 including the NFC antenna 100 is installed on the battery 11 of the mobile device 10, a distance between the first antenna electrode AED1 and the second antenna electrode AED2 may be in a range of 2 mm to 10 mm.

In FIG. 15, a back side cover 13 of the mobile device 10 and a back side of the mobile device 10 without the back side cover 13 are illustrated.

In one or more exemplary embodiments, as illustrated in FIG. 15, the NFC antenna 100 may be installed on an inner surface of the back side cover 13 of the mobile device 10.

The matching circuit 200 and the NFC chip 300 included in the NFC device 20 may be disposed inside a main body of the mobile device 10. In addition, as illustrated in FIG. 15, a first electrode 15 and a second electrode 17, which are coupled to the matching circuit 200, may be formed on the back side of the mobile device 10.

The first antenna electrode AED1 and the second antenna electrode AED2 of the NFC antenna 100 may be disposed close to each other. For example, as illustrated in FIG. 15, when the substrate 110 including the NFC antenna 100 is installed on the inner surface of the back side cover 13 of the mobile device 10, a distance between the first antenna electrode AED1 and the second antenna electrode AED2 may be in a range of 2 mm to 20 mm.

When the back side cover 13 is attached to the back side of the mobile device 10, the first antenna electrode AED1 and the second antenna electrode AED2 of the NFC antenna 100 may be electrically connected to the first electrode 15 and the second electrode 17, respectively. Therefore, the first antenna electrode AED1 and the second antenna electrode AED2 of the NFC antenna 100 may be electrically connected to the matching circuit 200 through the first electrode 15 and the second electrode 17, respectively.

In one or more exemplary embodiments, the NFC antenna 100 may be installed on an inner surface of a body frame of the mobile device 10. In this case, a distance between the first antenna electrode AED1 and the second antenna electrode AED2 may be in a range of 1 mm to 20 mm.

Figure 16:
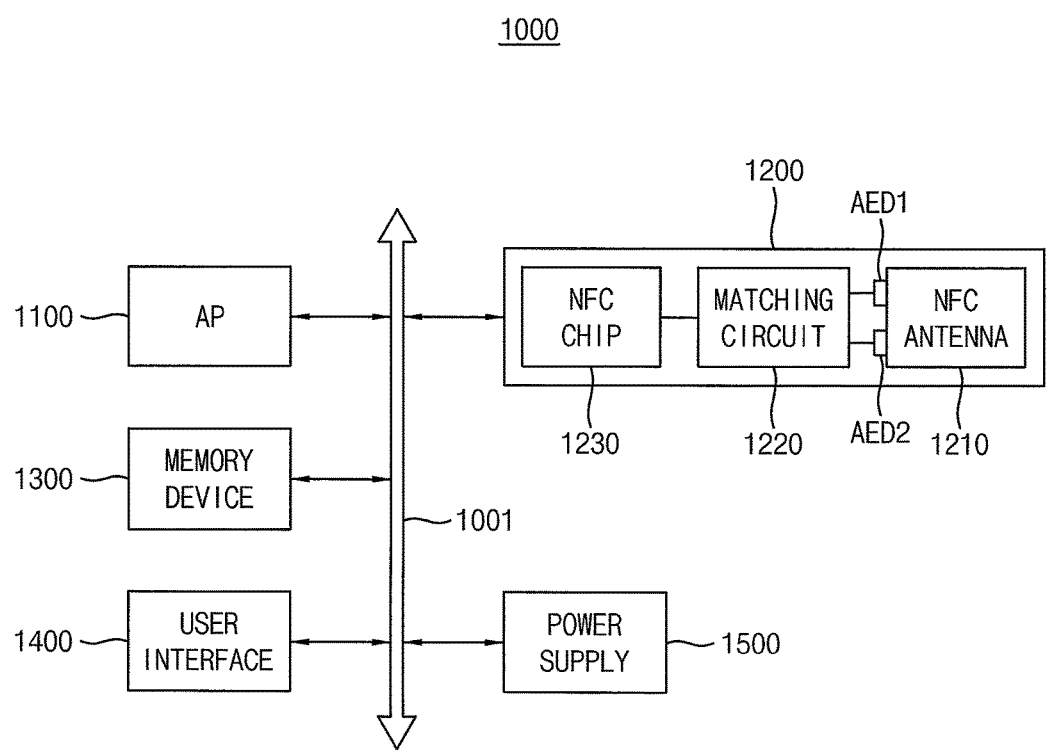
FIG. 16 is a block diagram illustrating a mobile system according to an exemplary embodiment.

FIG. 16 is a block diagram illustrating a mobile system according to an exemplary embodiment.

Referring to FIG. 16, a mobile system 1000 includes an application processor AP 1100, an NFC device 1200, a memory device 1300, a user interface 1400, and a power supply 1500. The application processor 1100, the NFC device 1200, the memory device 1300, the user interface 1400, and the power supply 1500 may be coupled together via an internal bus 1001.

In one or more exemplary embodiments, the mobile system 1000 may be, for example, a mobile phone, a smart phone, a personal digital assistant (PDA), a portable multimedia player (PMP), a digital camera, a camcorder, a music player, a portable game console, a navigation system, etc.

The application processor 1100 controls overall operations of the mobile system 1000. The application processor 1100 may execute applications, such as a web browser, a game application, a video player, etc. In one or more exemplary embodiments, the application processor 1100 may include a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 stores various data. For example, the memory device 1300 may store output data to be transmitted to an external device and input data received from the external device. In one or more exemplary embodiments, the memory device 1300 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The NFC device 1200 transmits the output data stored in the memory device 1300 to the external device through NFC. The NFC device 1200 receives the input data from the external device through NFC and stores the input data in the memory device 1300.

The NFC device 1200 includes an NFC antenna 1210, a matching circuit 1220, and an NFC chip 1230.

The NFC device 1200 may be implemented with the NFC device 20 of FIG. 2.

The user interface 1400 may include at least one input device, such as a keypad, a touch screen, etc., and at least one output device, such as a speaker, a display device, etc. The power supply 1500 may supply a power supply voltage to the mobile system 1000.

In one or more exemplary embodiments, the mobile system 1000 may further include an image processor, and/or a storage device, such as a memory card, a solid state drive (SSD), etc.

In one or more exemplary embodiments, the mobile system 1000 and/or components of the mobile system 1000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

The foregoing is illustrative of the present inventive concept and is not to be construed as limiting thereof. Although a few exemplary embodiments have been described, those skilled in the art will readily appreciate that many modifications to the described exemplary embodiments are possible without materially departing from the novel teachings and advantages of the present inventive concept. Accordingly, all such modifications are intended to be included within the scope of the present inventive concept. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A near field communication (NFC) antenna, comprising:
    a first antenna electrode and a second antenna electrode, both the first antenna electrode and the second antenna electrode being formed on a first surface of a substrate;
    a loop coil formed on the first surface of the substrate, the loop coil being directly coupled between the first antenna electrode and the second antenna electrode, and comprising a first plurality of turns; and
    a resonance coil formed on the first surface of the substrate, the resonance coil being electrically isolated from the loop coil,
    wherein the first antenna electrode is located inside each of the first plurality of turns of the loop coil, and the second antenna electrode is located outside each of the first plurality of turns of the loop coil,
    wherein an imaginary line passing through the first antenna electrode and the second antenna electrode is parallel to one of edges of the substrate, and
    wherein each of the first plurality of turns of the loop coil does not overlap each other.

2. The NFC antenna of claim 1, wherein the first plurality of turns of the loop coil pass between the first antenna electrode and the second antenna electrode.

3. The NFC antenna of claim 1, wherein a distance between the first antenna electrode and the second antenna electrode is in a range of 2 mm to 20 mm.

4. The NFC antenna of claim 1, wherein each of the first plurality of turns of the loop coil has a rectangular shape.

5. The NFC antenna of claim 1, wherein each of the first plurality of turns of the loop coil has a circular shape.

6. The NFC antenna of claim 1, wherein the substrate comprises a flexible printed circuit board (FPCB).

7. The NFC antenna of claim 1, wherein the substrate is configured to be installed on a battery of a mobile device, and
    wherein a distance between the first antenna electrode and the second antenna electrode is smaller than 10 mm.

8. The NFC antenna of claim 1, wherein the substrate is configured to be installed on a back side cover of a mobile device, and
    wherein a distance between the first antenna electrode and the second antenna electrode is smaller than 20 mm.

9. The NFC antenna of claim 1,
    wherein the resonance coil is physically detached from the loop coil, the first antenna electrode and the second antenna electrode, and comprises a second plurality of turns.

10. The NFC antenna of claim 9, wherein the resonance coil is located inside an innermost turn of the first plurality of turns of the loop coil.

11. The NFC antenna of claim 10, wherein a distance between the innermost turn of the first plurality of turns of the loop coil and an outermost turn of the second plurality of turns of the resonance coil is less than 2 mm.

12. The NFC antenna of claim 9, wherein a self-resonance frequency of the resonance coil corresponds to 13.56 MHz.

13. The NFC antenna of claim 9, wherein each of the second plurality of turns of the resonance coil has a rectangular shape.

14. The NFC antenna of claim 9, wherein each of the second plurality of turns of the resonance coil has a circular shape.

15. The NFC antenna of claim 1,
    wherein the resonance coil is physically detached from the loop coil, the first antenna electrode and the second antenna electrode, and comprises one turn, and
    wherein a resonance capacitor is coupled between two ends of the resonance coil.

16. The NFC antenna of claim 15, wherein the resonance coil and the resonance capacitor are located inside an innermost turn of the first plurality of turns of the loop coil.

17. The NFC antenna of claim 16, wherein a distance between the innermost turn of the first plurality of turns of the loop coil and the resonance coil is less than 2 mm.

18. The NFC antenna of claim 15, wherein a resonance frequency formed by the resonance coil and the resonance capacitor corresponds to 13.56 MHz.

19. A near field communication (NFC) device, comprising:
- an NFC chip comprising a first transmission electrode and a second transmission electrode, and configured to generate a transmission signal and to output the transmission signal through the first transmission electrode and the second transmission electrode;
- an NFC antenna formed on a first surface of a substrate, the NFC antenna comprising a first antenna electrode, a second antenna electrode, and a loop coil directly coupled between the first antenna electrode and the second antenna electrode, and configured to emit an electromagnetic wave based on the transmission signal; and
- a matching circuit coupled to the first transmission electrode, the second transmission electrode, the first antenna electrode and the second antenna electrode, and configured to perform impedance matching between the NFC chip and the NFC antenna,
- wherein the loop coil comprises a plurality of turns, the first antenna electrode is located inside each of the plurality of turns of the loop coil, and the second antenna electrode is located outside each of the plurality of turns of the loop coil,
- wherein an imaginary line passing through the first antenna electrode and the second antenna electrode is parallel to one of edges of the substrate, and
- wherein each of the plurality of turns of the loop coil does not overlap each other.

20. A mobile system, comprising:
- a near field communication (NFC) device configured to communicate with an external device through NFC;
- a memory device configured to store output data; and
- an application processor configured to control operations of the NFC device and the memory device,
- wherein the NFC device comprises:
  - an NFC chip comprising a first transmission electrode and a second transmission electrode, and configured to generate a transmission signal corresponding to the output data and to output the transmission signal through the first transmission electrode and the second transmission electrode;
  - an NFC antenna formed on a first surface of a substrate, the NFC antenna comprising a first antenna electrode, a second antenna electrode, and a loop coil directly coupled between the first antenna electrode and the second antenna electrode, and configured to emit an electromagnetic wave based on the transmission signal; and
  - a matching circuit coupled to the first transmission electrode, the second transmission electrode, the first antenna electrode, and the second antenna electrode, and configured to perform impedance matching between the NFC chip and the NFC antenna, and
- wherein the loop coil comprises a plurality of turns, the first antenna electrode is located inside each of the plurality of turns of the loop coil, and the second antenna electrode is located outside each of the plurality of turns of the loop coil,
- wherein an imaginary line passing through the first antenna electrode and the second antenna electrode is parallel to one of edges of the substrate, and
- wherein each of the plurality of turns of the loop coil does not overlap each other.

* * * * *